Feb. 19, 1946.  J. NEUFELD  2,395,289
METHOD AND APPARATUS FOR SEISMIC PROSPECTING
Filed May 27, 1943
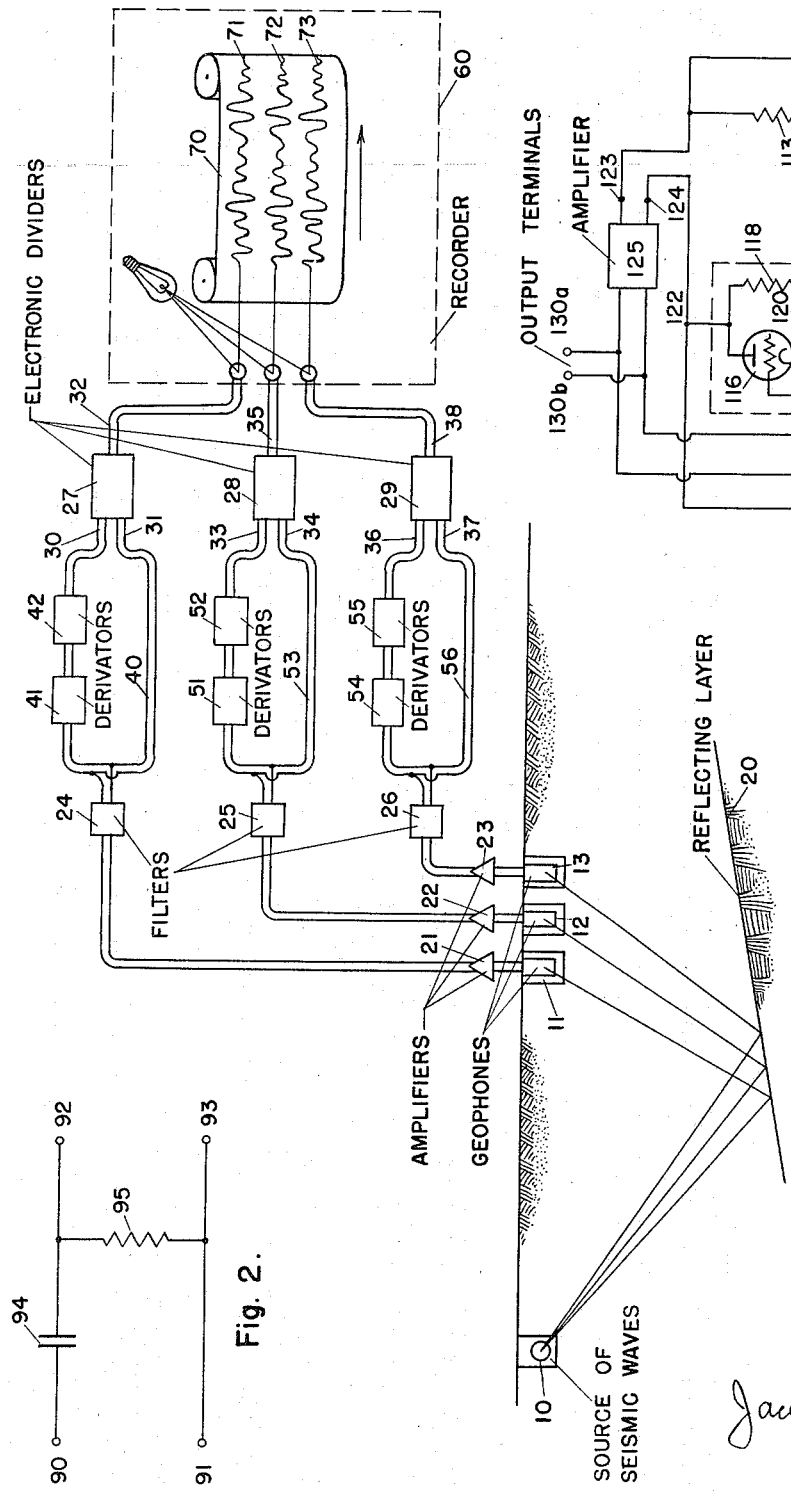
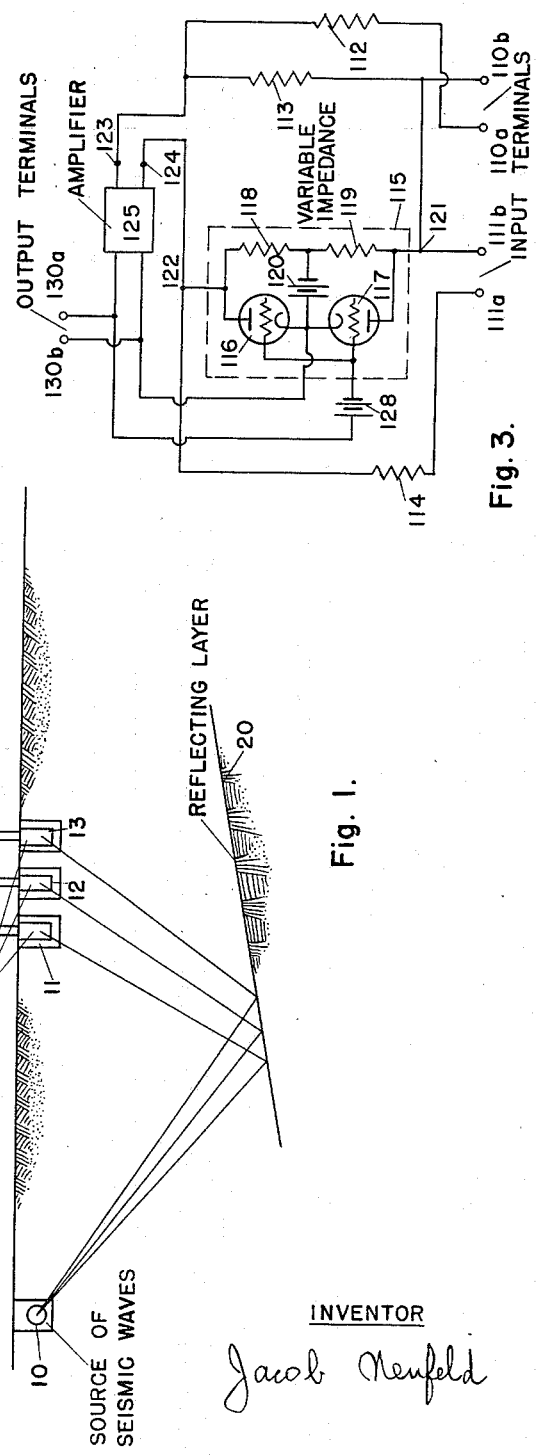
INVENTOR
Jacob Neufeld Patented Feb. 19, 1946

2,395,289

UNITED STATES PATENT OFFICE 2,395,289

METHOD AND APPARATUS FOR SEISMIC PROSPECTING

Jacob Neufeld, Tulsa, Okla., assignor to Engineering Laboratories, Incorporated, Tulsa, Okla., a corporation of Oklahoma Application May 27, 1943, Serial No. 488,775

6 Claims. (Cl. 177—352)

My invention relates to a method and apparatus by which elastic motions of solids, liquids and the like may be detected and recorded in a form more readily interpreted than in previous methods or apparatus used for this purpose.

My invention has particular application to the art of geophysical exploration in which motions of the earth initiated by explosions are detected and recorded at a distance, the records used thereafter to furnish data from which geological structure may be deduced and plotted.

The general method of geophysical exploration by means of elastic waves within the earth has long been known. In general this method comprises initiating an impulse somewhere within the earth's crust, and recording the resultant earth movement at a point more or less spaced from the point of origin of the impulse in such manner that the time elapsing between the instant of the impulse and the ensuing recorded movement may be determined. The original impulse sets up an elastic wave which is transmitted through the earth, and this wave, in general, will comprise one or a plurality of damped wave trains. Any discontinuity or variation of structure within the earth will reflect and/or refract these wave trains or a portion thereof, so that the record made at the receiving point will comprise a number of arriving waves, each derived from the original impulse, and each differing from the others in time of arrival, magnitude or both. The information desired from the record by determining the instant of each successive arrival.

Where the discontinuities in structure are widely separated and large in magnitude, i. e., where the strata are thick and the differences in density or elasticity between adjacent strata are large, fairly satisfactory results have, in the past, been obtainable by means of this method. But where the strata are thin and the differences in density and elasticity between them are small, the record will be the result of an extremely large number of wave trains of similar magnitude and random phase. Such a record is of extremely complex character. The determination of the instant of arrival of the various trains can only be approximated by rule of thumb method wherein the proportional errors are large, and the information to be gained from the record is so unreliable and contradictory as to make the method of little value.

The purpose of the present invention is to improve the records obtainable in the prior art. The invention is based upon certain experiments performed in the past which have shown that certain types of geological formations exert frequency selectivity and that they show a preference to certain frequencies and discriminate against other frequencies. These experiments have also shown that the spectral distribution of such frequency selectivity can be correlated with the physical and geological properties of the formations. It has been found for instance that the frequencies of seismic waves depend among other things on the geological age of the rocks and sediments through which the wave travels and on the depth to which they penetrate in the earth. Consequently each reflecting bed has a characteristic reflection frequency that is easily recognizable and can be used on a seismogram for the purpose of identifying the particular reflecting bed.

In the prior methods of seismic prospecting relatively little consideration was given to the frequency characteristics of the reflecting beds and the reflected wave trains were usually identified by their amplitude characteristics. In an ordinary seismogram the earth's vibrations are represented as a graph showing the vibrations in two coordinates, one of the said coordinates representing time and the other representing the instantaneous value characterizing the motion of the earth such as displacement, or velocity, or acceleration, or any other value. When it is desired to use seismograms for the purpose of geophysical exploration, seismograms of the type just described are made by the seismograph instruments and then interpreted by highly experienced geophysicists who have a background of vast experience which enables them to derive such information, as for example, the reflections and the dip of a certain subsurface geological formation by merely observing the graph visually.

In my invention I propose to supply the interpreter with an entirely new type of record which would give him essentially the same data in entirely different form. In this invention I propose to produce a graph indicating directly the manner in which the instantaneous frequency of the earth vibrations varies with time and it is the purpose of my invention to utilize the frequency characteristics of the waves rather than their amplitude characteristics in order to identify the reflecting beds. The relation between the frequency of a reflected wave train and the corresponding reflecting bed has been recognized a long time ago, but no efficient use of such a relation has been heretofore made. According to L. W. Blau (U. S. Patent 2,055,477, issued on September 29, 1936) in the Gulf region of the United States reflections which penetrate to less than about 2000 feet have a frequency of about 40 cycles. The frequency usually decreases with the increased depth; reflections which penetrate to a depth of 10,000 feet have a frequency of 30 cycles. The frequency range for the Gulf Coast is therefore from 30 to 40 cycles. Approximately the same conditions have been observed in Venezuela. In Oklahoma, higher frequencies are encountered which is to be ascribed to the fact that the rocks are geologically older. Reflections which penetrate to a depth of about 1000 feet have a frequency of about 55 cycles while 6000 feet reflections have a frequency of about 45 cycles. The range is therefore from 45 to 55 cycles in Oklahoma. In Pennsylvania, which is geologically older than Oklahoma the frequency range is from about 55 to 70 cycles.

It is therefore apparent that the present invention has as an object to modify the method of seismic interpretation used in the prior art. In the prior art the seismic records were essentially varying amplitude records and the criterion for locating reflections resulted from the behavior of varying amplitudes in several parallel traces of a seismogram. In the method described in connection with the present invention the reflections are identified not by the inspection of the amplitude variations, but by the inspection of the frequency variations in several parallel traces of a seismogram.

It is known that a wave packet that is being reflected from a certain geological horizon is characterized by a frequency distribution that is different from the frequency distribution of other wave trains that result from diffracted or refracted energy. Therefore a seismic reflection brings with itself a certain contribution of the frequency spectrum of the seismogram that is characteristic of the particular reflection. By inspecting in the several parallel traces of a seismogram the particular frequency contribution, a reflection can be identified and the reflecting bed can be located.

It is therefore the purpose of the present invention to eliminate the inconveniences of the prior art and to produce a novel method and means for producing seismographic records in which the determinacy of the reflection points will be considerably increased. Thus the calculations employing the interval of time between the detonation and the time of arrival of the reflected waves are therefore accurate and it is possible to obtain substantially the exact depth of the subterranean beds at the points of reflection.

A further purpose of my invention is to improve the method of identifying waves caused by the reflected energy.

A further purpose of my invention is to reduce the number of oscillations in a seismographic record and thus improve its clarity and legibility.

A further purpose of my invention is to translate a standard varying amplitude record into a variable frequency record.

The nature of the invention will be more readily understood by reference to the accompanying drawing in which Fig. 1 is a diagrammatic arrangement of the apparatus for seismic prospecting which includes a recording instrument for producing a variable frequency record of the incoming seismic waves.

Fig. 2 is a diagram of the derivating circuit which constitutes one of the elements of the arrangement of Fig. 1.

Fig. 3 is a diagram of the electronic divider which constitutes one of the elements of the arrangement of Fig. 1.

The present method consists essentially in studying the reflections from the standpoint of their frequency characteristics. In order to undertake such a study it is necessary to provide a new type of record which would be a varying frequency record. In the ordinary seismic records the amplitude represents either the displacement or the velocity or the acceleration of the earth particles. In the new type on the record the amplitude will represent the instantaneous frequency of the vibrating earth particles.

The standard definition of a frequency, i. e., the number of alternations per second has been applied only to a pure sinusoid. Since the seismic record is essentially a transient, it is necessary to extend the frequency definition so as to include also transients. Consider a transient varying with time according to a function $y=f(t)$. We shall assume that the frequency of the transient will be defined by the following expression:

$$(\text{Frequency})^2 = f^2 \left|\frac{\frac{d^2y}{dt}}{y}\right|$$

Consequently, for the purpose of the present invention the square of the frequency of a transient will be represented by the absolute value of the ratio of the second derivative of the transient to the transient itself. It is apparent that when the transient degenerates into a pure sinusoidal wave then the second derivative of the sinusoidal wave is represented in its absolute value by the function itself multiplied by the square of the frequency. Consequently, the above expression representing the ratio will coincide with a standard frequency definition when the transient degenerates into a sinusoidal wave.

Referring now more particularly to Figure 1, elastic waves are generated by detonating an explosive charge at the shot point 10. This charge may consist of any suitable detonating material such as dynamite, nitroglycerin, etc., in quantities depending on the nature of the ground being explored and the distance used between the different stations. At points 11, 12 and 13 geophones are buried in the ground. Although three geophones are shown on the drawing it is clear that their number and their spacing from the shot point and from each other depends on the particular problem and local conditions. Any suitable number of geophones may be used, located at distances from a few hundred feet to several miles from the shot point and from less than 100 feet to 2000 feet from each other. These geophones may be of any desired construction such as the moving coil type, the carbon button type or piezo-electric type, and may have an own frequency of any desired number of cycles per second.

The elastic waves generated near the surface of the earth by the explosion of the charge 10 reach a reflecting layer 20 and are reflected upwards towards the geophones 11, 12 and 13 where they are converted into electrical currents and transmitted through amplifiers 21, 22 and 23 to filters 24, 25 and 26. Each of the filters 24, 25 and 26 is adapted to eliminate undesirable disturbances such as the so-called ground roll, the microseismic unrest, etc., and may contain amplifier units in which the weak electrical currents are amplified by vacuum tube circuits applying any suitable number of stages.

One of the essential elements of the instrument shown in Fig. 1 consists of electronic dividers 27, 28 and 29 which are respectively connected through appropriate circuits to the outputs of the geophones 11, 12 and 13. By electronic divider we designate a network that is provided with two pairs of input terminals and one pair of output terminals and which produces across the output terminals a voltage which represents substantially the ratio of the voltages applied across the input terminals. Consequently, the electronic divider 27 receives two voltages at its input terminals 30, 31 and produces across its output terminals 32 the ratio of the two input voltages. In the same manner the electronic divider 28 produces across the terminals 35 an output voltage representing the ratio of the input voltages applied across the terminals 33 and 34 respectively, and the electronic divider 29 produces across the terminals 36 an output voltage representing the ratio of the input voltages applied across the terminals 36 and 37 respectively. The structural details of an electronic divider shall be described later in connection with Fig. 3.

As shown in the drawing of Fig. 1, the output of the filter 24 is connected to the input terminals 31 of the electronic divider 27 directly through the leads 40 and it is also connected to the other input terminals 30 of the electronic divider through a circuit which contains two derivating networks in cascade. These derivating networks are designated in the drawing by blocks 41 and 42 respectively and their structural details are explained further in connection with Fig. 2.

Assume that the voltage variation derived from the filter 24 is represented by a function $f(t)$. Then it becomes apparent that the output voltage derived from the derivator 41 is represented by the function $$\frac{df(t)}{dt}$$

and the output voltage obtained from the derivator 42 is represented by the function $$\frac{d^2f(t)}{dt^2}$$

Consequently, we have across the input terminals of the electronic divider 27 two voltages that are being represented respectively by functions $f(t)$ and $$\frac{d^2f(t)}{dt^2}$$

the first of the said input voltages being applied across the terminals 31 and the second of said input voltages being applied across the terminals 30. We obtain therefore across the output terminals of the electronic divider a function that represents the ratio of the two input voltages, i. e., which is represented by a function $$\frac{d^2f(t)}{dt^2}/f(t)$$

It is apparent from the considerations contained in the preceding paragraphs that the voltage appearing across the output terminals of the electronic divider 27 represents also the square of the instantaneous frequency of the wave trains derived from the filter 24. It can therefore be readily appreciated that I have provided a means for obtaining across each of the electronic dividers 27, 28 and 29 a voltage which corresponds to the square of the instantaneous frequency of the incoming wave trains which are detected by the geophones 11, 12 and 13 respectively. The outputs of the electronic dividers are subsequently applied to a recorder included in the dotted rectangle 60. The recorder contains a multiple galvanometer of standard design that is adapted to respond to the voltages derived from the dividers 27, 28 and 29 and causes beams of light to produce photographic records of these voltages upon a movable film 70 in a manner well known in the art. The photographic records thus produced are designated by the numerals 71, 72, 73 and represent three traces corresponding to the geophones 11, 12 and 13 respectively and representing the frequencies of wave trains derived from said geophones. It is apparent that each of said representations is in rectangular coordinates: the abscissa is in the time coordinate and the ordinate represents the instantaneous frequency corresponding to any determined value of the abscissa.

It can be now readily appreciated that I have provided a seismic method in which the incoming wave trains are recorded in a manner which illustrates visually the instantaneous variations of the frequencies with respect to time.

Consider now Fig. 2 representing schematically the diagram of a derivator circuit represented by either of the blocks 41, 42, 51, 52, 54 and 55 in the arrangement of Fig. 1. The derivator circuit is provided with input terminals 90, 91 and output terminals 92, 93 and consists of a condenser 94 inserted between the terminals 90 and 92 of a resistor 95 between the terminals 92 and 93. The operation of the derivator can be explained mathematically as follows:

Let $B_1(t)$ be the function representing the voltage applied across the input terminals 90 and 91 of the derivator, $B_2(t)$ the function representing the voltage across the output terminals 92 and 93, $C^1$ the capacitance of the capacitor 94, $R^1$ the resistance of the resistor 95 and $i(t)$ the current flowing through the capacitance 94. Assume also that a current $i(t)$ flows through the capacitance 94 and through the resistance 95 and the following relation holds true:

$$B_1(t) = \frac{1}{C^1}\int i(t)\,dt + R^1 i(t) \qquad (1)$$

Differentiating the Equation 1 we obtain:

$$\frac{dB_1(t)}{dt} = \frac{1}{C^1}i(t) + R^1\frac{di(t)}{dt} \qquad (2)$$

By selecting the proper values of the resistance $R^1$, for example, making $R^1$ negligibly small, the term $R^1 di/dt$ can be made negligible as compared to $i(t)/C^1$ and the following relation may hold with an approximation satisfactory for practical purposes:

$$\frac{dB_1(t)}{dt} = \frac{1}{C^1}i(t) \qquad (3)$$

Multiplying both sides of the equation by $C^1 R^1$ we obtain:

$$C^1 R^1 \frac{dB_1(t)}{dt} = R^1 i(t) = B_2(t) \qquad (4)$$

Consequently, the expression $R^1 i(t)$ which represents the voltage drop across the resistor 95 between the output terminals 92 and 93 is substantially proportional to $dB_1(t)/dt$ which represents the time derivative of the input voltage across the terminals 92 and 93. The Relation 4 results from neglecting the term $R_1 di/dt$ in the Equation 2 and the approximation obtained has been found to be satisfactory by taking $C^1$ equal to 0.0003 microfarad and $R^1$ equal to 10,000 ohms.

Consider now the electronic divided designated by block 27, 28 or 29. Either of blocks 27, 28 or 29 represents a transducer provided with two pairs of input terminals and one pair of output terminals and adapted to produce across the output terminals a voltage representing the ratio of the two input voltages. In order to understand better my invention, I am including herewith a diagram of an electronic divider, shown in Fig. 3 and some explanatory remarks referring to Fig. 3.

Briefly, in Fig. 3, numerals 110a, 110b and 111a, 111b designate two pairs of input terminals and the numerals 130a, 130b designate the output terminals of an electronic divider. As stated above, an electronic divider is adapted to produce across its output terminals a voltage, representing substantially the ratio of voltages, applied respectively across the input terminals 110a, 110b and 111a, 111b. The input terminals 110a, 110b are connected to a circuit consisting of a resistance 112 in series with a resistance 113. The input terminals 111a, 111b are connected to a circuit consisting of a resistance 114 in series with a circuit arrangement designated by a block 115, the said circuit arrangement comprising two three electrode vacuum discharge tubes 116 and 117 connected in push-pull, two resistors 118, 119 connected across the anodes of the tubes 116, 117 respectively and a battery 120 inserted between the cathodes of the tubes 116, 117 and the common terminal of the resistors 118, 119 respectively. The terminal 121 of 115 is connected directly to one of the terminals of 113 while the other terminal of 113 and the terminal 122 of 115 are respectively connected to the input terminals 123, 124 of a D. C. amplifier 125. The D. C. amplifier 125 is of a push-pull type well known in the art. One of the output terminals of the amplifier 125 is connected to the cathodes of the tubes 116, 117 and the other output terminal of 125 is connected through the battery 128 to the grids of the tubes 116, 117. Both output terminals of 125 are also connected to the output terminals 130a, 130b of the electronic divider.

The operation of this arrangement can be explained as follows:

Let R designate the resistance of 112 or 114, these two resistances being equal one to another and let $r_1$ designate the resistance of 113. The electric circuit contained in the block 115 and inserted between the terminals 121, 122 acts primarily as a resistance; let the latter be represented by $r_2$. It is apparent that the value of $r_2$ depends among other things upon the plate-cathode resistances of the tubes 116 and 117. On the other hand, the plate cathode resistances of the tubes 116, 117 are functions of their grid biases, the latter being determined by the voltage between the terminals 130a, 130b.

Consequently the voltage between the terminals 130a, 130b can be used for controlling the equivalent resistance $r_2$ of the block 115, and the magnitude of this voltage determines the value of the resistance $r_2$.

The current flowing from the terminal 110a into the resistor 112 in series with the resistor 113 and returning to the terminal 110b can be expressed as follows:

$$i_1 = \frac{E_1}{R+r_1} \quad (5)$$

Assuming that $r_1 \ll R$ the Expression 5 reduces to $$i_1 = \frac{E_1}{R} \quad (6)$$

and the voltage across the terminals of the resistance 113 can be expressed as follows:

$$v_1 = i_1 r_1 = \frac{E_1 r_1}{R} \quad (7)$$

In a similar manner, the current flowing from the terminal 111a into the resistor 114 and traversing the block 115 from the terminal 122 to the terminal 121 and entering into the terminal 111b can be expressed as follows:

$$i_2 = \frac{E_2}{R+r_2} \quad (8)$$

Assuming that $r_2 \ll R$ the Expression 8 reduces to $$i_2 = \frac{E_2}{R} \quad (9)$$

and the voltage across the terminals 122 and 121 becomes $$v_2 = i_2 r_2 = \frac{E_2 r_2}{R} \quad (10)$$

The voltages $v_1$ and $v_2$ oppose each other in such a manner that the voltage $v_3$ across the input terminals 123, 124 of the D. C. amplifier 125 is equal to the difference of $v_1$ and $v_2$, i. e., $$v_3 = v_1 - v_2 = \frac{1}{R}[E_1 r_1 - E_2 r_2] \quad (11)$$

and the amplified voltage across the output terminals 130a, 130b of the D. C. amplifier is $$v_4 = K v_3 = \frac{K}{R}[E_1 r_1 - E_2 r_2] \quad (12)$$

where K is an amplification factor.

The voltage $v_4$ in series with the voltage of the battery 128 constitutes the grid bias of the tubes 116, 117. It is apparent that $v_4$ determines the plate resistance of the tubes and also determines the resistance $r_2$ of the block 115. Under the conditions shown in the figure the value of $r_2$ is such as to render the expression $$v_3 = \frac{1}{R}[E_1 r_1 - E_2 r_2] \quad (13)$$

very small, i. e., $$v_3 \ll \frac{E_1 r_1}{R} \quad (14)$$

and $$v_3 \ll \frac{E_2 r_2}{R} \quad (15)$$

Assume that the expression 13 is zero, i. e., $$\frac{1}{R}[E_1 r_1 - E_2 r_2] = 0 \quad (16)$$

whence $$r_2 = \frac{E_1}{E_2} r_1 \quad (17)$$

Let $r_1$ be equal to one ohm. Then $$r_2 = \frac{E_1}{E_2} \quad (18)$$

It is thus seen from the Formula 18 that the magnitude of the resistance $r_2$ numerically expresses the ratio of the voltages $E_1$ and $E_2$. Consequently, the problem of determining the ratio of voltages across the terminals 110a, 110b and 111a, 111b is equivalent to determining $r_2$, i. e., the equivalent resistance of the block 115 between the terminals 121 and 122. On the other hand the value of $r_2$ is controlled and determined by the voltage $v_4$ across the output terminals 130a, 130b. Consequently, in the Expression 18 instead of measuring the value $r_2$ expressing the ratio $E_1/E_2$ it is sufficient to determine the voltage $v_4$ which corresponds to the given value of $r_2$, the said voltage $v_4$ being measured across the output terminals 130a, 130b.

If now the relative values of the voltages $E_1$ and $E_2$ change, the voltage across the output terminals 130a, 130b will indicate a new value of the ratio $E_1/E_2$ and, in general, in case of varying input voltages the voltage across the output terminals 130a, 130b will indicate automatically and continuously the instantaneous value of their ratio.

Assume for instance that the voltage $E_2$ increases and the voltage $E_1$ is maintained constant. Then the current $i_2$ and the voltage $v_2$ will also increase, and will cause a corresponding variation of the voltage $v_3$. Then the amplified voltage $v_4$ derived from the output terminals of 125 changes its value in such a manner as to cause a decrease of the resistance $r_2$ of the block 115. Then the voltage drop $v_2$ across the resistor $r_2$ becomes again substantially equal to the voltage drop $v_1$ across the resistor $r_1$ so that the Relation 16 is substantially satisfied. It should be noted, however, that in this case the resistance $r_2$ has a different and a smaller value which corresponds to a new and a smaller value of the $E_1/E_2$. To this new value of $r_2$ corresponds the new value of $v_4$ which is directly indicated by the voltage across the output terminals 130a, 130b.

It is therefore apparent that the electrical circuit, substantially as shown and described in connection with Fig. 3 operates as an electronic divider and may be substituted in place of blocks 27, 28 and 29 in Fig. 1.

In view of my invention and disclosure, variations and modifications to meet individual whim or particular need will doubtless become evident to others skilled in the art, to obtain part or all of the benefits of my invention, without copying the structure shown, and I, therefore, claim all such in so far as they fall within the reasonable spirit and scope of my invention.

I claim:

1. In a method of seismic surveying in which seismic waves originated by a disturbance below the earth's surface are translated into electrical vibrations, the step of producing an electrical effect dependent upon a time derivative of said vibrations, and producing another electrical effect which represents substantially the ratio between said time derivative and said electrical vibrations.

2. In a method of seismic surveying in which seismic waves originated by a disturbance below the earth's surface are translated into electrical vibrations, the step of producing an electrical effect dependent upon the second time derivative of the said vibrations, and producing another electrical effect which represents substantially the ratio between said second time derivative and said electrical vibrations.

3. In a method of seismic surveying in which seismic waves originated by a disturbance below the earth's surface are translated into electrical vibrations, the step of producing a voltage varying substantially according to a formula $$\frac{d^2f(t)}{dt^2}/f(t)$$

where $f(t)$ represents said electrical vibrations, and recording said voltage.

4. In a method of seismic surveying in which seismic waves originated by a disturbance below the earth's surface are translated into electrical vibrations, the step of filtering undesirable frequencies among said electrical vibrations, and producing a voltage varying substantially according to a formula $$\frac{d^2f(t)}{dt^2}/f(t)$$

where $f(t)$ represents the electrical vibrations from which the undesirable frequencies have been eliminated.

5. In a system for geological surveying in which seismic waves resulting from an earth disturbance are translated into electrical vibrations, a filter for eliminating certain undesirable frequencies among said electrical vibrations and deriving a voltage varying with time $t$ as a function $f(t)$, means for producing a voltage varying substantially as $$\frac{d^2f(t)}{dt^2}/f(t)$$

means for recording said voltage.

6. In a system for geological surveying, means for translating the seismic waves produced by a disturbance into electrical vibrations, means for producing a voltage varying substantially as $$\frac{d^2f(t)}{dt^2}/f(t)$$

where $f(t)$ represents said electrical vibrations, means for recording said voltage.

JACOB NEUFELD.